Dec. 23, 1947.  C. E. SLAUGHTER  2,433,325
EXTRUDED RESINOUS BRISTLES
Filed Aug. 19, 1942    2 Sheets-Sheet 1
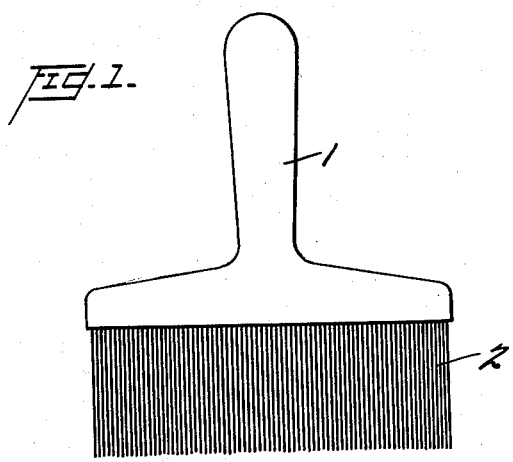
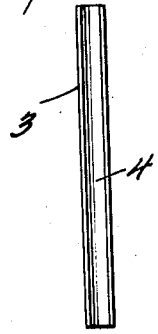
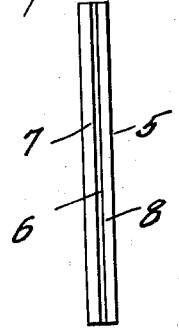
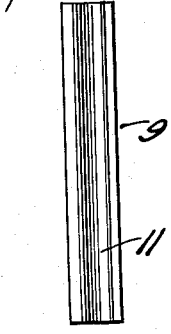
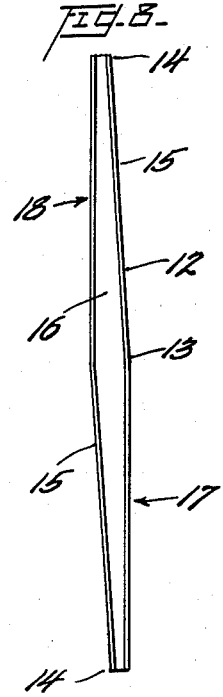
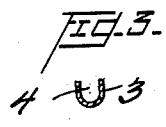
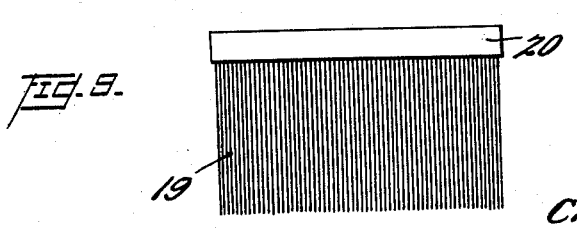
Inventor
Charles E. Slaughter
By Sol Shappirio
Attorney

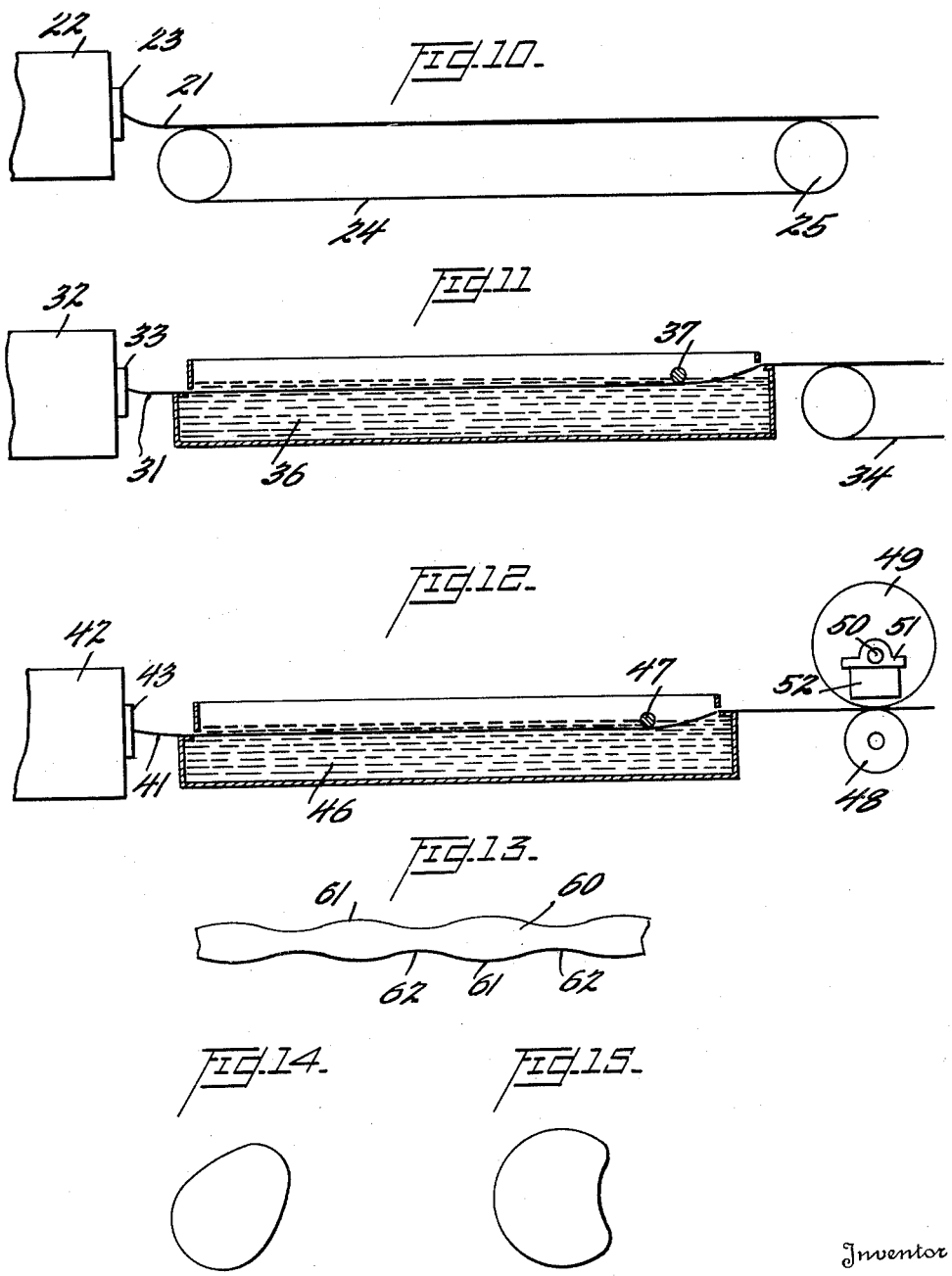

Patented Dec. 23, 1947

2,433,325

UNITED STATES PATENT OFFICE 2,433,325

EXTRUDED RESINOUS BRISTLES

Charles E. Slaughter, New Canaan, Conn., assignor to Extruded Plastics, Inc., Norwalk, Conn., a corporation of Connecticut Application August 19, 1942, Serial No. 455,387

3 Claims. (Cl. 15—159)

This invention relates to extruded resinous products and to methods and machines for making the same and particularly relates to specialized articles of unique character and their manufacture.

Among the objects of the present invention is the production of specialized articles such as synthetic bristles from extruded material.

Other objects include the production of extruded articles of varying but controlled cross sectional contour.

Still further objects and advantages will appear from the more detailed description set forth below, it being understood, however, that such more detailed description is given by way of illustration and explanation only, and not by way of limitation, since various changes therein may be made by those skilled in the art without departing from the scope and spirit of the present invention.

In connection with that more detailed description, there is shown in the accompanying drawings, in Figure 1, an elevational view of a brush utilizing synthetic bristles of the present invention; in Figures 2, 4 and 6, enlarged views of modified forms of bristles of the present invention; in Figures 3, 5 and 7, sections through the bristles of Figures 2, 4 and 6 respectively; in Figure 8, an elevation of an enlarged view of a further modified form of bristle; in Figure 9, a modified form of brush produced with bristles of the present invention; in Figure 10, a form of machine utilized in accordance with the present invention; in Figure 11, a further form of machine; in Figure 12, a still further form of machine; in Figure 13, a plan view of an extruded tape produced by the present invention; and in Figures 14 and 15, cam shaped rolls used for producing bodies of modified cross-sectional contour.

In accordance with the present invention, extruded articles are produced from extrudable compositions particularly of synthetic resinous materials, which articles have unique utilities.

Synthetic resinous materials have particularly important properties for use herein and are exemplified by cellulose derivatives such as the esters, particularly cellulose acetetates, cellulose acetate butyrates, and the ethers, such as ethyl cellulose; polymerized vinyl materials such as polymerized vinyl acetate, and other resinous compositions that desirably may be extruded in continuous lengths. When they are to be used for paints or other coating compositions, the synthetic resinous material should be of a character like vinyl resins or nylon resins unaffected by the solvents present in the composition.

One type of article within the scope of the present invention is a synthetic resinous bristle produced from a material of the character set forth above. In Figure 1, a conventional form of brush handle is shown at 1 carrying bristles 2 produced as herein set forth. Such synthetic plastic bristles, because their surface is quite smooth, do not exhibit the property of capillarity for the coating composition or paint to be applied. To supply the capacity for such capillary action and so that the bristles will retain the composition or paint to be applied to a surface, they are desirably provided with channels of a size to exhibit capillarity. Such channels may be readily produced longitudinally in the filament used for forming the bristles, during the extruding operation, to provide a groove open along the side of the bristle. Such channel may, for example, be of an overall width of from .003" to .015". A section of this shape will offer a capillary action to the paint or similar material and will serve as a sponge to hold a considerable volume of coating composition within the body of the brush.

The cross sectional contour of the bristle or filament from which it is made, may take different shapes, all exhibiting, however, the capacity to hold the paint or similar material. As shown in Figure 2, the bristle 3 has a U-shaped cross-section providing a channel 4 running longitudinally along the bristle and open to the side. A continuous filament of this contour may be extruded from desired material and then cut to the desired length for use as bristles.

In the modified form shown in Figure 4, the bristle 5 has the open channel 6, the side walls 7, 8 of the bristle forming an almost complete annulus leaving a capillary space between them.

In the form shown in Figure 6, the bristle 9 is approximately S-shaped in cross-section giving both an inner channel 10 and an outer channel 11. Here again the bristle is readily produced from an elongated continuous extruded filament having the desired contour.

The examples given above are exemplary of filaments and bristles that can be produced in accordance with the present invention in accordance with which any desired cross-sectional shape can be produced, curved, circular, triangular, square, etc., as long as a channel or groove open to the side is provided having capillary dimensions. These open grooves are essential in using the bristles in brushes for application of coating compositions but would not be essential where the brushes are employed for other purposes.

In order to simulate natural hair type bristles more closely, the bristle may be produced in a form where it tapers from a larger to a smaller cross-sectional area, still retaining, however, the longitudinal channel or groove. Thus as in Figure 8, filament 12 is shown as tapering from the maximum cross-sectional area at 13 to each end 14 where it has its minimum cross-sectional contour, the taper desirably being regular and gradual as shown at 15. The longitudinal channel 16 runs throughout the filament. If such a filament is cut at its mid-point 13, two bristles 17, 18 are produced.

A filament may be extruded as a continuous length made up of a multiplicity of units 12 and such filament severed at each point of maximum and minimum cross-sectional area to produce a multiplicity of tapered bristles, each provided with the capillary channel. Various means and processes for readily and economically producing such filaments or other forms of extruded bodies of varying cross-sectional contour are set forth below.

In the form of brush shown in Figure 9, a series of synthetic resinous or plastic bristles 19 are joined together by cementing or causing adherence of the ends of the bristles into a block or solid head portion 20. Since thermoplastic materials are desirably used in making the bristles, one set of ends may be welded together as by heat to form the block portion 20. Or the same result may be secured by solvent action, a bundle of bristles having their ends immersed in a solvent and then welded together by such solvent action.

In the production of extruded bodies of varying cross-sectional size, various expedients may be used. The form of the extruded article is a function, among other factors, of the speed of extrusion and of the rate at which the extruded article is drawn from the extruding die as by a conveyor belt or rolls. If the speed of extrusion is varied while the rate of withdrawal of the extruded article as by the belt or rolls is constant, the cross-sectional contour of the article will be modified. Similarly increase in the rate of withdrawal by the belt or rolls, while keeping the speed of extrusion constant, will affect the character of the cross-sectional contour of the article produced. Advantage is taken of these features to control the cross-sectional area of the extruded article to produce articles of varying cross-sectional size and contour, and particularly to produce articles of regularly varying but controlled cross-section.

While it is possible to vary the speed of extrusion for the purpose set forth immediately above, it is not generally feasible with present day equipment to arrange for the extrusion speed to be varied to a sufficiently short harmonic to permit this constant increase and decrease of cross-sectional area. It is more readily accomplished by the variation in speed of withdrawal of the extruded material prior to the time of the set of the plastic or synthetic resinous material, and variation in the speed of the conveyor belt or of rolls permits the production of these unusual shapes with a wide degree of latitude in cross-sectional area and an exact control at all times.

In the machine shown in Figure 10, the extruded section 21 in the form of a filament, tape or other desired element, is extruded from the extrusion machine 22 through the die 23 on to the endless conveyor belt 24 which may be driven in the usual way as through the pulley 25, from which the extruded section 21 is withdrawn to be cut to desired lengths. By varying the speed of the conveyor belt with respect to the speed of extrusion, control of the cross-section of the piece is obtained. Thus by increasing the speed of the conveyor belt with respect to the speed of extrusion through the die, the cross-section of the extruded piece may be reduced in size retaining, however, the contour given the piece by the die. If the speed of the belt with respect to the speed of extrusion is varied from time to time by periodic increase and decrease, a corresponding variation in the cross-sectional size of the piece is obtained; and if such speed variation is regular, then the changes in cross-sectional size will vary regularly from a maximum to a minimum over the length of the extruded section.

In the machine shown in Figure 11, a similar operation is carried out, the only difference here being that the extruded piece is first taken through a water bath before being received on the conveyor belt. In this instance the extrusion machine 32 extrudes through the die 33, and the extruded section 31 as a tape, filament or other shape passes into a water bath 36 under the keeper bar 37 which retains the extruded section under the water in the bath, from which the section 31 passes to the conveyor belt 34. In use of a machine of this character, the same control and operation may be carried out as set forth above in connection with the machine of Figure 10. In both of these cases, the final size of the cross-section is determined by the speed of the conveyor belt.

The conveyor belt is not absolutely essential particularly when a water cooling bath is used. It is possible with certain sections, to take the section directly from the water bath and pass it through rubber rolls, for example, in order to drag the section through the bath at an exact predetermined speed. In such cases the conveyor belt may be omitted as unnecessary. This expedient may desirably be used in control of the cross section area of the extruded piece with a control and regularity superior to that obtainable by the machines and methods of Figures 10 and 11. Figure 12 illustrates a machine for this purpose. The extrusion machine 42 extrudes through the die 43 producing the section of desired contour 41 which passes through the water bath 46 under the keeper bar 47, and then out of the bath between the rolls 48, 49. Normally where no varying cross-sectional area is to be produced, these rolls are concentric and round. By making the drawing roll 49 eccentric, the speed of the draw from the die will change, of course, according to the effective diameter of the drawing roll at any moment. This is illustrated in Figure 12. The roll 49 shown here as the drawing roll, is eccentrically mounted on the shaft 50 carried in bearings 51 placed in vertical guides or slides 52. The roll 48 is carried in a fixed bearing. The drawing action of such roll 49 will vary periodically and regularly in the manner described immediately above to produce an extruded article which has a cross-sectional area that varies regularly from a maximum point to a minimum point and such units will be repeated throughout the length of the extruded piece.

Figure 13 illustrates a plan view of a tape extruded on the machine of Figure 12, such tape 60 having a multiplicity of points 61, 61 of maximum width alternating with points 62, 62 of minimum width, the variations being regular and under the complete control of the operator. The filament of Figure 8 illustrates one section of a continuous filament that may be extruded on a machine of the character of Figure 12 modified to give a filament of regularly alternating points of maximum diameter and minimum diameter for the production of tapering bristles as explained above; the contour of the filament in cross-section being controlled by the extrusion die and is not lost by the drawing operation utilized to vary the cross-sectional size.

In a similar manner, rolls may be utilized with any reasonable contour to so change the cross-sectional area of the extruded plastic to suit the particular requirements. Figures 14 and 15 illustrate sections through two different types of rolls that can be used in this way having cam shaped profiles to produce sections of predetermined varying widths and cross-section.

Articles of any desired cross-sectional contour in the form of bars, tubes, ribbons, tapes, etc. may thus be produced having tapering portions as described above.

Having thus set forth my invention, I claim:

1. As an artificial bristle, a stiff, smooth-walled thermoplastic filament having in cross-section a thin wall encompassing a capillary channel open along the side of the bristle.

2. A continuous, stiff, smooth-walled synthetic resinous filament having in cross-section a thin wall encompassing a capillary channel open along the side of the filament.

3. A brush comprising a handle portion carrying a multiplicity of stiff, smooth-walled synthetic resinous filaments at least some of which filaments have in cross-section a thin wall encompassing a capillary channel open along the side of the filaments.

CHARLES E. SLAUGHTER.

REFERENCES CITED

The following references are of record in the file of this patent:

UNITED STATES PATENTS

| Number | Name | Date |
|---|---|---|
| 2,099,688 | Hill et al. | Nov. 23, 1937 |
| 2,207,158 | Neville et al. | July 9, 1940 |
| 2,250,112 | Larson | July 22, 1941 |
| 2,030,211 | Hulse | Feb. 11, 1936 |
| 2,047,395 | Stelkens | July 14, 1936 |
| 2,022,895 | Morrell | Dec. 3, 1935 |
| 2,292,905 | Smith | Aug. 11, 1942 |
| 2,174,991 | Masland | Oct. 3, 1939 |
| 2,207,157 | Neville et al. | July 9, 1940 |
| 1,773,969 | Dreyfus et al. | Aug. 26, 1930 |
| 2,041,798 | Taylor | May 26, 1936 |
| 1,930,229 | Dreyfus et al. | Oct. 10, 1933 |
| 2,045,498 | Stevenson | June 23, 1936 |
| 2,302,077 | Kohorn | Nov. 17, 1942 |
| 2,317,485 | Rider | Apr. 27, 1943 |